United States Patent [19]

Ishibashi et al.

[11] Patent Number: 5,329,631
[45] Date of Patent: Jul. 12, 1994

[54] MICROPROCESSOR SYSTEM FOR EFFECTIVELY USING A PART OF AN ADDRESS SPACE

[75] Inventors: Masaaki Ishibashi, Tama; Tsutomu Shimasue, Yokohama, both of Japan

[73] Assignee: Fujitsu Limited, Kawasaki, Japan

[21] Appl. No.: 752,993

[22] Filed: Sep. 3, 1991

Related U.S. Application Data

[63] Continuation of Ser. No. 494,480, Mar. 16, 1990, abandoned.

[30] Foreign Application Priority Data

Mar. 16, 1989 [JP] Japan ................................ 1-62005

[51] Int. Cl.⁵ .............................................. G06F 12/06
[52] U.S. Cl. ...................................... 395/425; 395/400; 364/245; 364/245.31; 364/280.2; 364/DIG. 1
[58] Field of Search ... 364/200 MS File, 900 MS File; 395/400, 425, 700; 365/189.02, 230.02, 230.03

[56] References Cited

U.S. PATENT DOCUMENTS

| | | | |
|---|---|---|---|
| 4,443,847 | 4/1984 | Bradley et al. | 364/200 |
| 4,475,175 | 10/1984 | Ishii | 395/400 |
| 4,503,491 | 3/1985 | Lushtak et al. | 364/200 |
| 4,602,330 | 7/1986 | Ikeya | 364/200 |
| 4,679,166 | 7/1987 | Berger et al. | 364/900 |
| 4,744,054 | 5/1988 | Kawata et al. | 365/104 |
| 4,779,191 | 10/1988 | Greenblatt | 364/200 |
| 4,849,875 | 7/1989 | Fairman et al. | 364/200 |
| 4,901,063 | 2/1990 | Kimusa et al. | 364/521 |
| 4,918,586 | 4/1990 | Niimura et al. | 395/425 |
| 4,943,913 | 7/1990 | Clark | 395/700 |
| 4,984,193 | 1/1991 | Nakagawa | 395/425 |
| 5,012,408 | 4/1991 | Conroy | 364/200 |
| 5,032,981 | 7/1991 | Bril et al. | 364/200 |
| 5,034,887 | 7/1991 | Yasui et al. | 364/200 |
| 5,060,186 | 10/1991 | Barbagelata et al. | 364/200 |

FOREIGN PATENT DOCUMENTS

| | | | |
|---|---|---|---|
| 62-25348 | 2/1987 | Japan | G06F 12/06 |
| 62-279441 | 12/1987 | Japan | G06F 12/06 |

*Primary Examiner*—Gopal C. Ray
*Attorney, Agent, or Firm*—Staas & Halsey

[57] ABSTRACT

A microprocessor system is provided for extending an address space. To effectively use a program in the original address space and to reduce the processing time to return from the extended address space to the original address space, the microprocessor system includes a basic memory having a first address space for storing at least one program and a second address space for storing data. In addition, the microprocessor system provides an extended memory having an extended address space used in place of a part of the first address space, for storing at least one additional program and an address extending hard register for storing a flag and extending addresses of the extended memory. The flag indicates which part of the first address space and the extended address space is to be used, and the extending addresses being used to designate the extended memory when the flag indicates that the extended address space is to be used. Further, the microprocessor system includes a microprocessor, operatively connected to the basic memory, to the extended memory, and to the address extending hard register, for generating an address signal and for processing data. The address signal either the basic memory or the address extending hard register, and the program stored in the part of the first address space is transferred by the microprocessor to the second address space when the flag indicates that the part of the first address space is to be used.

14 Claims, 7 Drawing Sheets

STRUCTURE OF ADDRESS EXTENDING REGISTER
OF EMBODIMENT OF INVENTION

EXEN : "1" → SPECIFIES BASIC ADDRESS SPACE
"0" → SPECIFIES EXTENDED ADDRESS SPACE

IMA0,1 :

| ADDRESS | EX0<br>0000-<br>-1FFF | EX1<br>2000-<br>-3FFF | EX2<br>4000-<br>-5FFF | EX3<br>6000-<br>-7FFF |
|---|---|---|---|---|
| IMA 0 | '0' | '1' | '0' | '1' |
| IMA 1 | '0' | '0' | '1' | '1' |

FLOWCHART OF SYSTEM START-UP PROCESS OF EMBODIMENT OF INVENTION

FLOWCHART OF EXTENDED SPACE USING PROCESS OF EMBODIMENT OF INVENTION

MICROPROCESSOR SYSTEM FOR EFFECTIVELY USING A PART OF AN ADDRESS SPACE

This application is a continuation, of application Ser. No. 07/494,480, filed Mar. 16, 1990, now abandoned.

BACKGROUND OF THE INVENTION

1. Field of the Invention

The present invention relates to a microprocessor system having an extended address space, and particularly to an address extending technique for a microprocessor system.

Microprocessors are easy to use, have a good cost performance, and therefore, are frequently employed in electronic controllers such as trunks or other equipment in an electronic exchange system. Such a microprocessor as mentioned above is, for example, an eight-bit microprocessor. They have, however, only a 64-kilobyte basic address space, which is not sufficient to store a large program for providing complicated functions. To solve this problem, an extension of the address space has been developed. Instead of the eight-bit microprocessor, a sixteen-bit microprocessor may be employed to provide a required address space. This, however, enlarges the circuitry and adversely affects the cost performance.

2. Description of the Related Arts

Cross references related to the present invention are: Japanese Patent Publication (Kokai) No. 62-25348 and Japanese Patent Publication (Kokai) No. 62-25348.

A conventional address space extending technique provides a basic address space with an extended address space that supplants a part of the basic address space. For example, the eight-bit microprocessor has a basic address space ranging from 0000 to FFFF, and for instance, a region of 8000 to 9FFF in the basic address space is supplanted by an extended address space ranging from 0000 to 8000. In this case, a basic memory is not provided for the region of 8000 to 9FFF of the basic address space, and instead a memory having a required capacity such as 8 kilobytes or smaller, is provided for the extended address space. This is possible when memory chips each having a memory capacity of 8 kilobytes are employed.

In recent years, however memory capacity has been increased greatly. Memory chips are no longer limited to a capacity of eight kilobytes (64 kilobits), but now comprise 32 kilobytes (256 kilobits) or larger. With such memories having a large capacity, e.g., a basic address space of, for example, 64 kilobytes may be filled by only two of 32-kilobyte RAM and ROM memory chips. Therefore, even when a part of one memory chip is to be supplanted by an extended address space, the whole space of the memory chip should be supplanted.

It may be possible to return to an address of the original 32-kilobyte memory chip after the extended address space has been used. This, however, requires a complex program including the steps to return to the original address space, resulting in a long processing time and a large memory space for the program.

Further, according to the conventional technique explained above, the part of the basic address space, 8000 to 9FFF, for example, supplanted by the extended address space may be a wasted space that is never used.

SUMMARY OF THE INVENTION

An object of the present invention is to provide a microprocessor system having an extended address space in which the part of a basic address space supplanted by the extended address space is used effectively with a short processing time and a small memory space for the program to return from the extended address space to the original address space.

To attain the above object, there is provided, according to the present invention, a microprocessor system for extending an address space, comprising: a basic memory having a first address space for storing at least one program and a second address space for storing data; an extended memory having an extended address space used in place of the first address space, or a part of the first address space, for storing at least one additional program; an address extending hard register for storing a flag and extending addresses of the extended memory, the flag indicating which part of the first address space and the extended address space is to be used, and the extending addresses being used to designate the extended memory when the flag indicates that the extended address space is to be used; and a microprocessor, operatively connected to the basic memory, to the extended memory, and to the address extending hard register, for generating an address signal and for processing data, the address signal designating either one of the basic memory and the extending hard register.

The program stored in the part of the first address space is transferred by the microprocessor to the second address space when the flag indicates that the part of the first address space is to be used; and the extending addresses are used to designate the extended memory when the flag indicates that the extended address space is to be used and when the address signal from the microprocessor designates the part of the first address space.

BRIEF DESCRIPTION OF THE DRAWINGS

The above objects and features of the present invention will be more apparent from the following description of the preferred embodiment with reference to the drawings, wherein.

DESCRIPTION OF THE PREFERRED EMBODIMENTS

Figure 1:
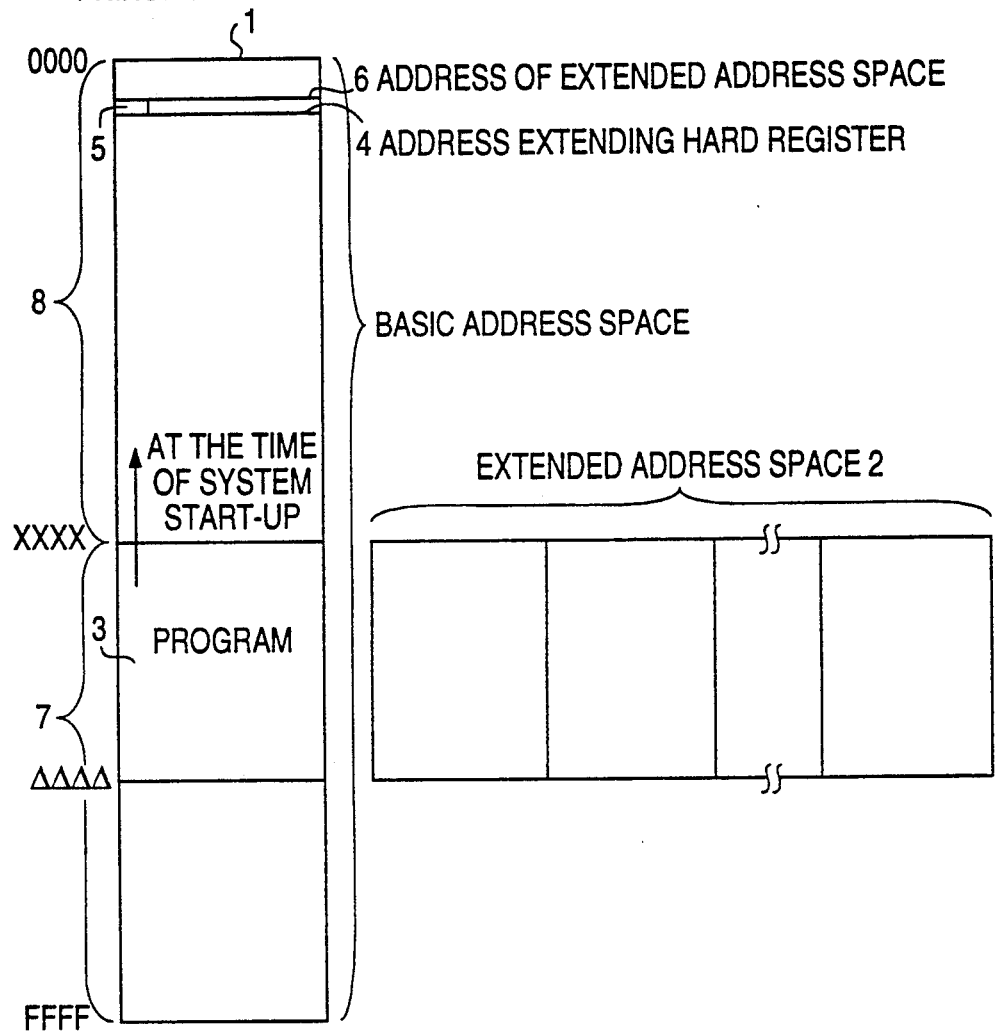
FIG. 1 is an address map for explaining a principle of an embodiment of the present invention.

FIG. 1 is an address map for explaining a principle of an embodiment of the present invention. In the figure, numeral 1 denotes a basic address space (0000 to FFFF) for storing basic programs and data used by a microprocessor; 2 an extended address space used by the microprocessor in place of a part 3 (xxxx to IIII) of the basic address space 1 and storing extended programs; 4 an address extending hard register; 5 a flag for indicating which of the part 3 of the basic address space 1 or the extended address space 2 is used; and 6 an address of the extended address space 2.

The basic programs and fixed data are stored in a program storing region 7 realized by, for example, a read only memory (ROM) chip, and the data is stored in a data storing region 8 realized by, for example, a random access memory (RAM) chip.

Before starting up the system, the data storing region 8 is empty.

The part 3 of the basic address space 1 stores programs, which are transferred to a data storing region of the basic address space 1 at the time of system start-up, i.e., during an initial program load of the system.

At the start-up of the system, the flag 5 of the address extending hard register 4 is set to "1" to transfer the program data stored in the part 3 to a data storing region 8 of the basic address space 1. To use the extended address space 2, the flag 5 of the address extending hard register 4 is set to "0", and a block of the extended address space 2 to be used is specified by an address held in the address extending hard register 4. With this arrangement, the data stored in the part 3 ranging from xxxx to ΔΔΔΔ of the basic address space 1 is effectively used, and the part 3 can be switched to the extended address space 2 after the start-up of the system. When the program is stored in the address space ranging from ΔΔΔΔ to FFFF, the process automatically goes to that space without any specific instruction to move from the extended address space 2 to that address space between ΔΔΔΔ and FFFF.

Figure 2:
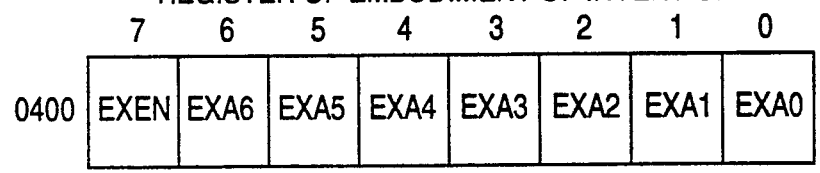
FIG. 2 is a view showing an address extending register according to an embodiment of the present invention.

FIG. 2 shows an arrangement of an address extending hard register according to an embodiment of the present invention. In the figure, the address extending hard register 4 is an eight-bit register having bits EXA0 through EXA6 and EXEN. The bit 7 (EXEN) specifies which of a basic address space and an extended address space is used, and the bits 0 through 6 specify an address of the extended address space. The address extending hard register 4 is placed, as an example, on the address 0400 of the data storing region 8.

Figure 3A:
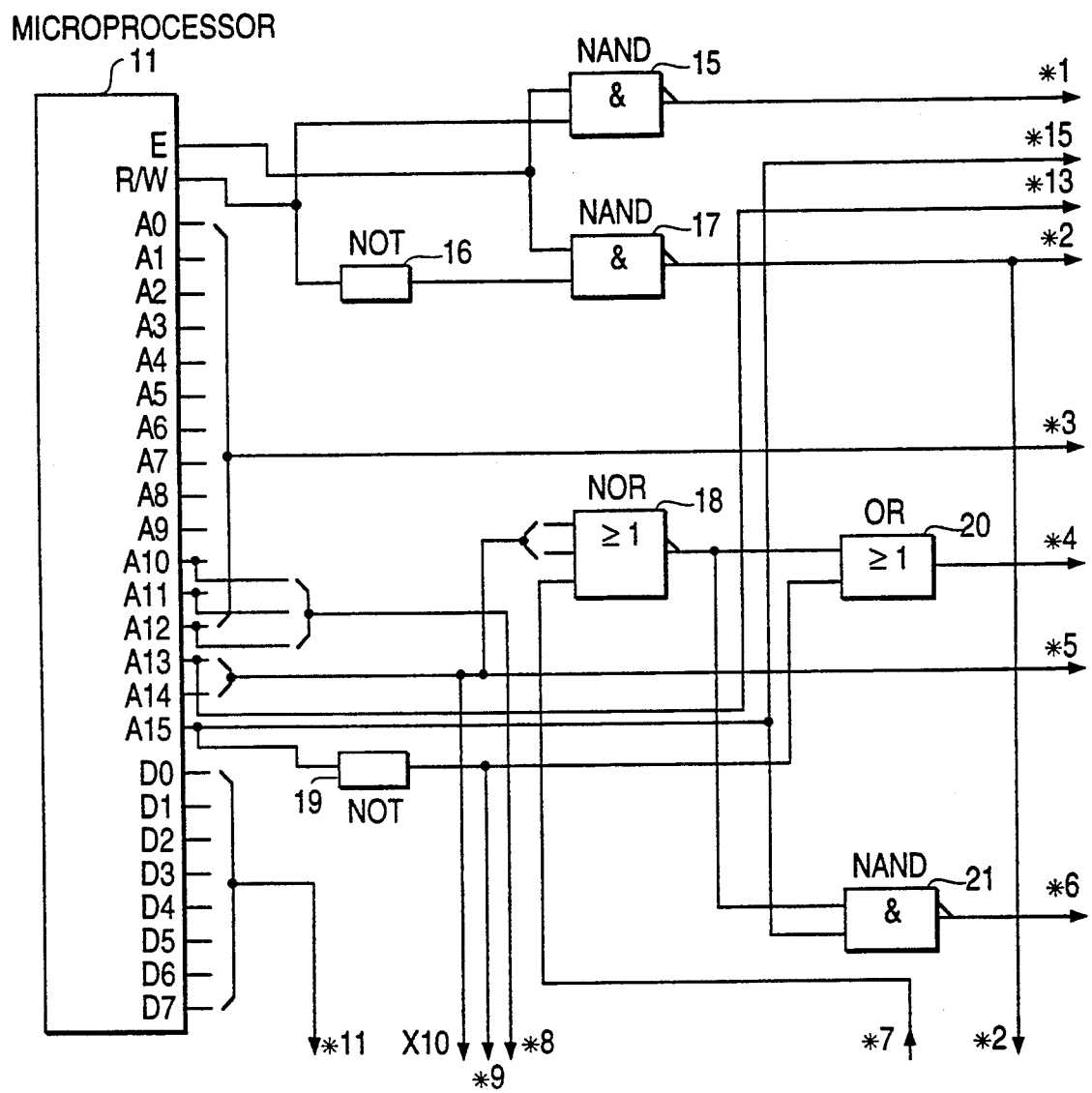
FIGS. 3A to 3C are block diagrams showing a microprocessor system according to an embodiment of the present invention.
Figure 3B:
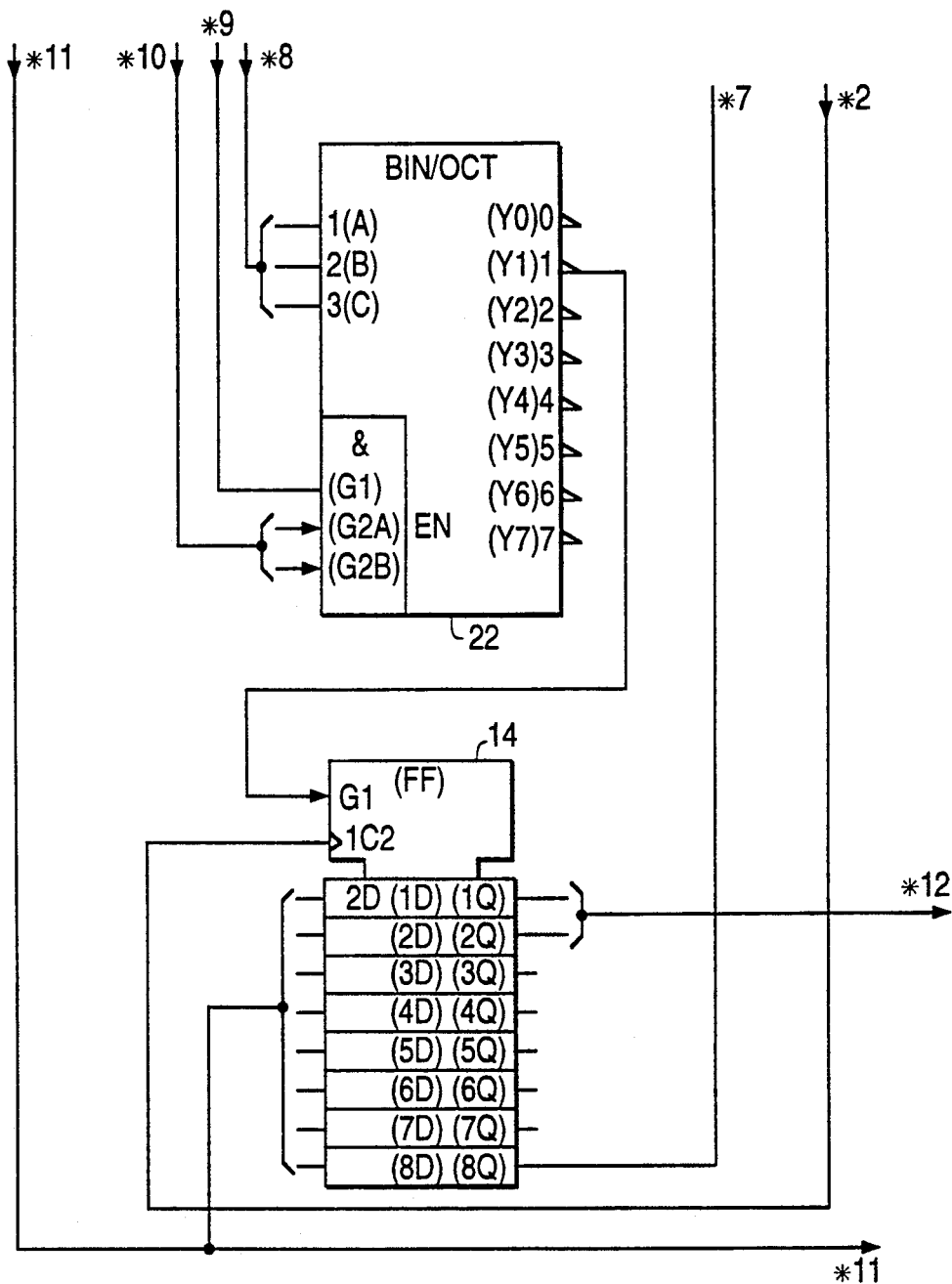
Figure 3C:
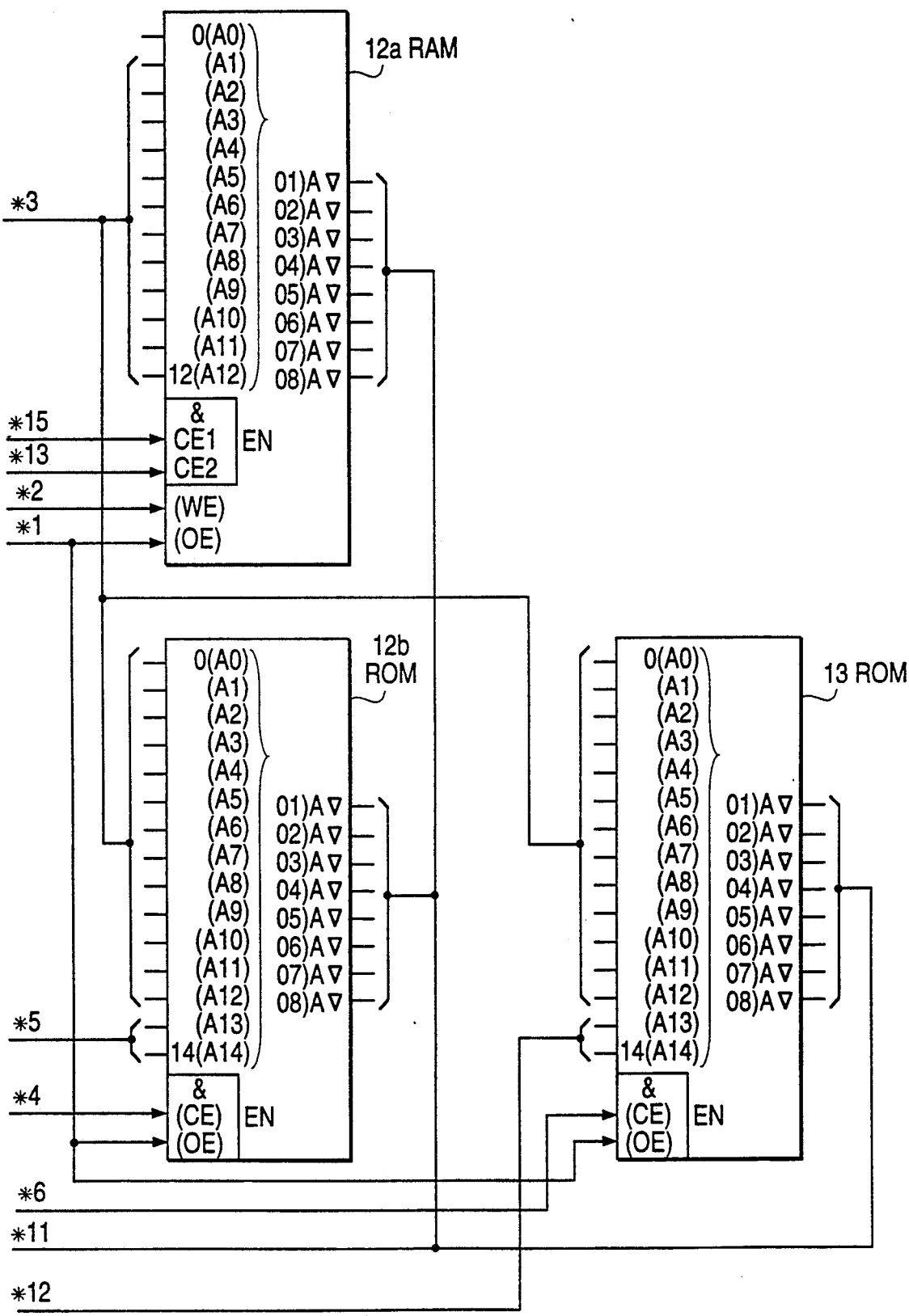

FIGS. 3A to 3C are block circuit diagrams showing a part of an eight-bit microprocessor system according to an embodiment of the present invention. In the figures, numeral 11 denotes an eight-bit microprocessor; 12a a RAM having a capacity of 256 kilobits (32 kilobytes) for storing data in the basic address space; 12b a ROM having a capacity of 256 kilobits (32 kilobytes) storing programs and fixed data in the basic address space; 13 a ROM having a capacity of 256 kilobits arranged for the extended address space; 14 the address extending hard register; 15 a NAND gate circuit; 16 a NOT gate circuit; 17 a NAND gate circuit; 18 a NOR gate circuit; 19 a NOT gate circuit; 20 an OR gate circuit; 21 a NAND gate circuit; and 22 an address decoder.

The microprocessor 11 generates a 16-bit address A0 through A15, 8-bit data D0 through D7, an enable signal E, and a read/write signal RW.

Whether or not an address space is extended is determined by the value of an output 8Q (corresponding to the flag 5 of FIG. 1 and the bit 7 (EXEN) in FIG. 2) of the address extending hard register 14, and the values of higher order address outputs A13, A14, and A15 of the microprocessor 11.

Combinations of the values of the outputs A13, A14, A15 of the microprocessor 11 and the output 8Q of the address extending hard register 14 will be explained next.

(1) At the time of system start-up, the address extending hard register 14 is reset so that the output 8Q (*7) thereof is set to "1".

In this state, even when the highest order address signal A15 is "1", the basic ROM 12b is selected and the extended address space ROM 13 is not selected. This is because, when the bit 8Q is "1", the inverted output of the NOR gate 18 is "0" regardless of the values of the address outputs A13 and A14 applied to the inputs of the NOR gate 18, accordingly, if the address output A15 is "1," an output of the NOT gate circuit 19 is "0," and an output (*4) of the OR gate circuit 20 is "0," which is provided to an inverting chip enable terminal CE of the basic ROM 12b, thereby selecting the basic address space ROM 12b. Meanwhile, an output (*6) of the NAND gate circuit 21 is "1," which is provided to an inverting chip enable terminal CE of the extended ROM 13, thereby not selecting the extended address space ROM 13. The address output A15 of the microprocessor 11 is also applied through a line *15 to an inverting first chip enable terminal CE1 of the RAM 12a so that it is not selected.

The operation of moving programs from a part of the ROM 12b to a part of the RAM 12a at the time of system start-up (during the initial program load of the microprocessor) is carried out byte by byte. Namely, the programs stored in the address space of, for example, 8000 to 9FFF are transferred to a part of the RAM 12a. To this end, first, the enable signal E in the microprocessor 11 is set to "1" and the read/write signal RW is set to a read signal ("1"). The read signal passes through the NAND gate 15 so that its output becomes "0" which is applied through a line *1 to the inverting output enable terminals OE of the RAM 12a, the ROM 12b, and the extended ROM 13. Then, by generating an appropriate address to designate an address in the range from 8000 to 9FFF of the ROM 12b, one byte of data is read. Next, the read/write signal is changed to a write signal ("0"). By generating an appropriate address to designate an address in the RAM 12a, the programs read from the ROM 12b are written in the RAM 12a. By repeating the above operation, the programs in the range from 8000 to 9FFF in the ROM 12b are moved to the RAM 12a at the time of system start-up.

(2) The ROM 12b stores an instruction to change the output 8Q from "1" to "0".

When the output 8Q of the address extending hard register 14 is "0," when the address outputs A13 and A14 of the eight-bit microprocessor 11 are each "1," and when the address output A15 of the microprocessor 11 is "1," then the inverted output of the NOR gate circuit 18 is "1," and therefore, an output (*4) of the OR gate circuit 20 is "1," thereby not selecting the basic address space ROM 12b. Meanwhile, an inverted output (*6) of the NAND gate circuit 21 is "0," which is applied to an inverting chip enable terminal CE of the extended address space ROM 13 thereby selecting the extended address space ROM 13. At this time, the values of outputs 1Q and 2Q of the address extending hard register 14 are provided through a line *12 to address input terminals A13 and A14 of the extended address space ROM 13 to select one of four eight-kilobyte blocks of the extended address space ROM 13.

In this way, the addresses 8000 through 9FFF of the basic address space ROM 12b are supplanted by the extended address space ROM 13.

(3) With the output 8Q of the address extending hard register 14 being "0," at least one of the address outputs A13 and A14 of the eight-bit microprocessor 11 being "1," and the address output A15 of the microprocessor 11 being "1," the inverted output of the NOR gate circuit 18 is "0" and the output of the OR gate circuit 20 is "0," thereby selecting the basic address space ROM 12b. Namely, when the address generated by the microprocessor 11 is over 9FFF, the ROM 12b is automatically selected without any specific instruction to return from the extended area to the ROM 12b. Meanwhile, the inverted output of the NAND gate circuit 21 is "1," thereby not selecting the extended address space ROM 13.

The address decoder 22 is enabled when the RAM 12a is selected. Namely, with the address outputs A13, A14, and A15 of the eight-bit microprocessor 11 through lines *9 and *10 each being "0" the 3-bit outputs A10 through A12 through a bus line *8 from the eight-bit microprocessor 11 are decoded by the address decoder 22. When the 3-bit addresses A10 through A12 are 100, the output (Y1) 1 is selected so that the address extending hard register 14 is enabled. Namely, the address extending hard register 14 is enabled when the eight-bit microprocessor 11 provides an output address of 0400 in hexadecimal expression, or 0000 0100 0000 0000 in binary expression. This value, however, is not limited to 0400, and any value in a RAM region is acceptable.

Figure 4:
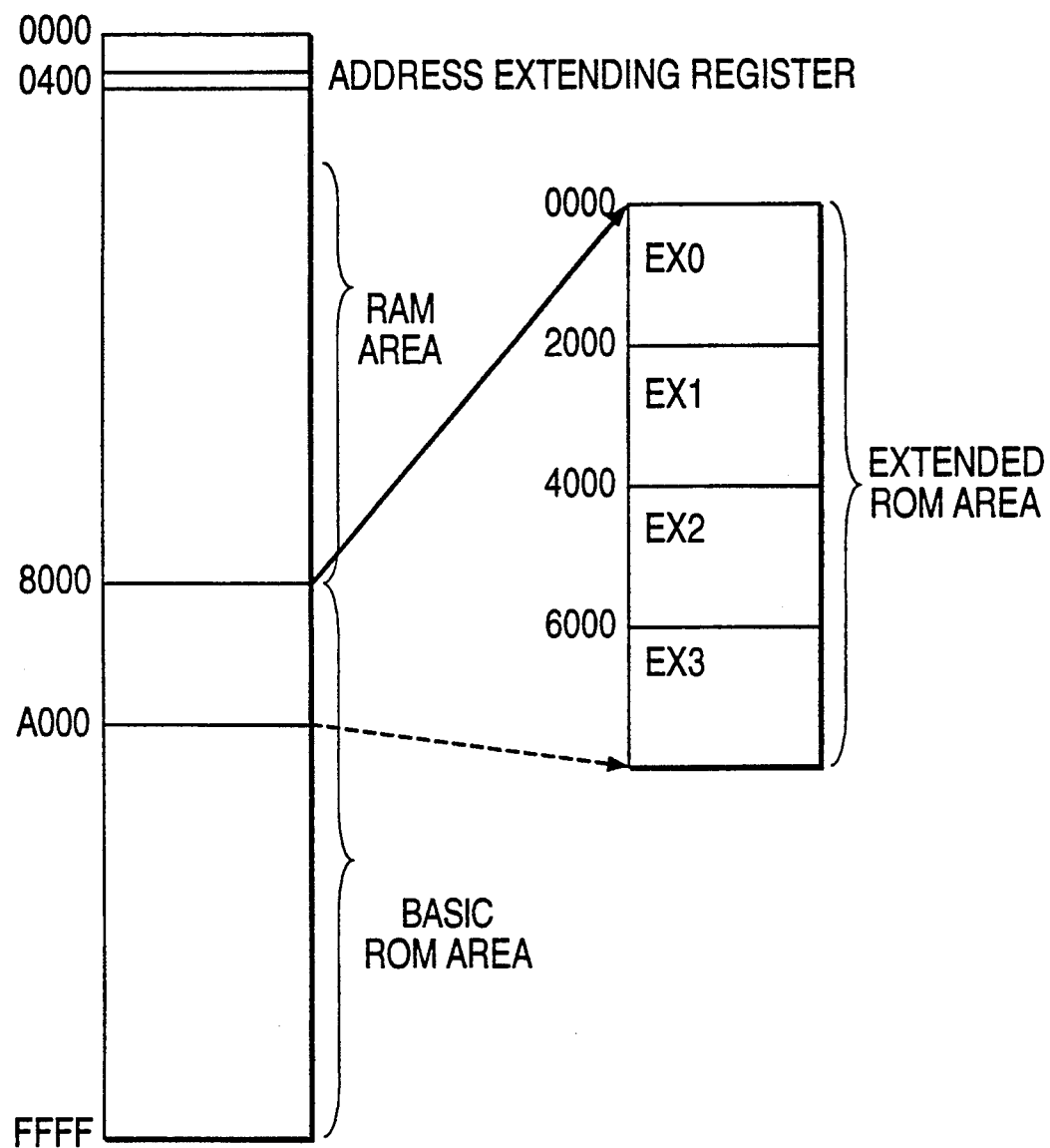
FIG. 4 is an address map according to an embodiment of the present invention.

FIG. 4 is an address map of the system of FIG. 3. In FIG. 4, the basic address space ranges from 0000 to FFFF. The address extending hard register 14 is the flip flop shown in FIG. 3 and is positioned at an address 0400. The RAM area extends from 0000 to 7FFF including the address extending hard register region. In this embodiment, the part of the basic address space that is supplanted by the extended address space ranges from 8000 to 9FFF. The extended address space ROM comprises four blocks EX0, EX1, EX2, and EX3 having address spaces 0000 through 1FFF, 2000 through 3FFF, 4000 through 5FFF, and 6000 through 8FFF, respectively.

Figure 5:
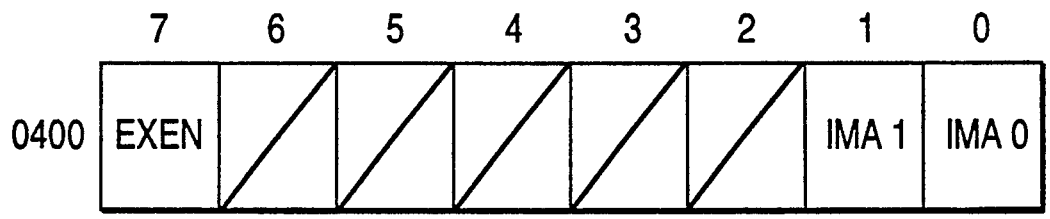
FIG. 5 is a view showing the address extending register according to an embodiment of the present invention.

FIG. 5 shows an arrangement of the address extending hard register 14 according to the embodiment of the present invention. In the figure, the address extending hard register 14 is an eight-bit register having bits 0 (1Q) through 7 (8Q). The bits 0 (1Q) and 1 (2Q) specify one of the blocks of the extended address space, and the bit 7 (8Q) specifies the basic address space or the extended address space. Namely, the bit 7 (EXEN) of "1" specifies the basic address space, and "0" the extended address space. A combination of the bits 0 (IMA0) and 1 (IMA1) of "00" specifies the block EX0, "10" the block EX1, "01" the block EX2, and "11" the block EX3.

Figure 6:
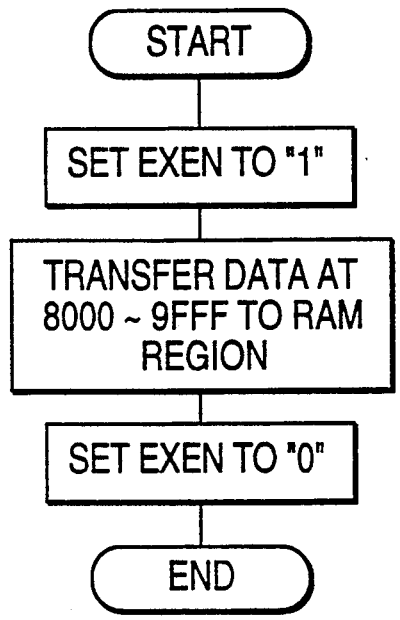
FIG. 6 is a flowchart showing a system start-up process according to an embodiment of the present invention.

FIG. 6 is a flowchart showing a system start-up process. When the system is started up, the flag EXEN of the address extending hard register 14 is set to "1" to specify the basic address space. The data at the addresses 8000 through 9FFF of the basic address space are transferred to the RAM region ranging from 0000 through 7FFF. The flag EXEN is then set to "0." Thereafter, when an address in the range from 8000 to 9FFF is accessed, the extended space is used. In addition the program data stored at the addresses 8000 through 9FFF of the basic address space are used effectively.

Figure 7:
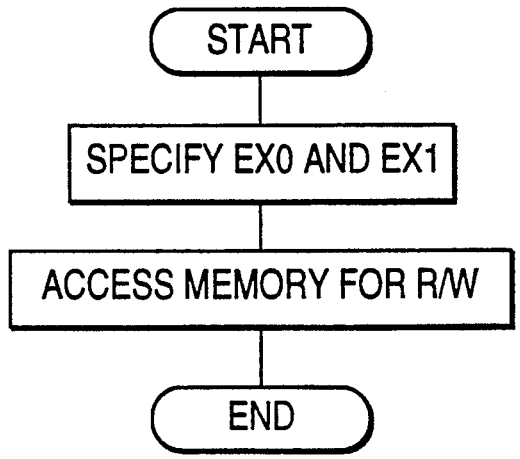
FIG. 7 is a flowchart showing an extended space using process according to an embodiment of the present invention.

FIG. 7 is a flowchart showing an extended space using a process according to the embodiment of the present invention. During a usual operation except for the system start-up operation, any of the blocks EX0 to EX3 of the extended address space may be specified, and after any one is specified, a reading or writing access to the addresses 8000 through 9FFF may be carried out to the specified block.

As explained above, at the time of system start-up, a common program sets the bit 7 of the address extending hard register 14 to "1" transfer the program data stored in the part of the basic address space to the RAM region of the basic address space. After that, the bit 7 of the address extending hard register 14 is set to "0," so that, by only setting the bits 0 and 1 of the address extending hard register 14 as required, a program can freely use the basic space of addresses A000 through FFFF and the extended space. The invention can therefore improve the performance of the system without complicating the programs.

As apparent from the above explanation, the present invention provides a microprocessor system having an extended address space that supplants a part of a basic address space. Program data stored in the part of the basic address space to be supplanted is transferred to a RAM region of the basic address space at the time of system start-up. Accordingly, the part of the basic address space to be supplanted can be used effectively, and therefore, the system can store a large amount of programs, thereby improving the performance of the system.

We claim:

1. A microprocessing system for extending an address space, comprising:

a basic semiconductor memory having a first address space formed by a one chip memory and a second address space formed by at least one memory chip, said first address space including a part for storing at least one of a program and data before startup of the microprocessing system;

an extended semiconductor memory re-using said part of the first address space as an extended address space after startup of the microprocessing system to address said extended semiconductor memory;

system start up indicating means for indicating whether said microprocessing system is in a system start up state;

a microprocessor, connected to said basic and extended semiconductor memories to directly address the first and second address spaces and operatively connected to said system start up indicating means, said microprocessor comprising reading and writing means for reading said one of the program and the data from said part of said first address space and for writing said one of the program and the data into said second address space when said system start up indicating means indicates that said microprocessing system is in the system start up state; and address extending hard register means, connected to said microprocessor, having the address located in said second address space, for storing an extended address for accessing said extended semiconductor memory instead of accessing said part of said first address space when said system start up indicating means indicates that said microprocessing system is not in the system start up state and when said part of said first address space is addressed.

2. A microprocessing system as claimed in claim 1, further comprising:

first gate means for generating a first enable signal for enabling said first address space of said basic semiconductor memory when said system start up indicating means indicates that said part of said first address space of said basic semiconductor memory is to be used and when an address signal generated and received from said microprocessor designates said part of said first address space; and second gate means for enabling said extended semiconductor memory when said system start up indicating means indicates that said extended address space is to be used and when said address signal generated by and received from said microprocessor designates said part of said first address space, wherein, when said address signal generated from said microprocessor designates said first address space other than said part of said first address space, said first address space is selected even when said system start up indicating means indicates that said extended address space is to be used.

3. A microprocessing system as claimed in claim 1, wherein said address extending hard register means comprises an address extending memory in said second address space, and the extended address is stored in said address extending memory of said address extending hard register means when said microprocessor generates an address signal for designating an address of said address extending memory in the second address space and said extended address is written from said microprocessor as extended address data.

4. A microprocessing system as claimed in claim 3, further comprising a decoder for decoding an address signal generated by said microprocessor to access said address extending hard register means when said microprocessor accesses the one of the data and the program in one of said basic and extended semiconductor memories.

5. A microprocessing system as claimed in claim 4, wherein said extended address space comprises a plurality of blocks, and said extended address stored in said address extending memory designates one of said plurality of blocks in response to said data generated by said microprocessor.

6. A microprocessing system as claimed in claim 5, wherein said first address space is formed by a read only memory.

7. A microprocessing system as claimed in claim 6, further comprising:

first gate means for generating a first enable signal for enabling said read only memory when said system start up indicating means indicates that said part of said first address space is to be used and when said address signal generated and received from said microprocessor designates said part of said first address space; and second gate means for enabling said extended semiconductor memory when said system start up indicating means indicates that said extended address space is to be used and when said address signal received from said microprocessor designates said part of said first address space, wherein said read only memory is selected, even when said system start up indicating means indicates that said extended address space is to be used when said address signal received from said microprocessor designates another part of said first address space other than said part of said first address space.

8. A microprocessing system as claimed in claim 7 wherein said address extending hard register means has a second address in said first address space.

9. A microprocessing system as claimed in claim 8 wherein said address extending hard register means is selected to generate a register flag in said system start up indicating means and said extended address, when said microprocessor generates the address signal for designating a memory address in said read only memory or the address in said second address space, and when said first address of said system-start up indicating means in said first address space is designated by said address signal.

10. A microprocessing system as claimed in claim 9, wherein said address extending hard register means is said address extending memory for providing said extended address set by the data generated by said microprocessor.

11. A microprocessing system as claimed in claim 10, wherein said address extending memory is enabled when said microprocessor generates the address signal for designating said address extending hard register means in said second address space.

12. A microprocessing system as claimed in claim 1 wherein said second address space is formed by a random access memory.

13. A microprocessing system as claimed in claim 1 wherein said extended memory is formed by a read only memory.

14. A microprocessor system for effectively using a part of an address space, comprising:

a basic semiconductor memory having a first area and a second area for storing at least one of a program and data before an initial program load of the microprocessor system;

an extended semiconductor memory having a plurality of memory blocks each having the same capacity;

a designating register connected to said extended semiconductor memory and having contents for designating each of said plurality of memory blocks; and a central processing unit, connected to said basic and extended semiconductor memories and operatively connected to said designating register, the first and second areas of said basic semiconductor memory and the memory blocks of said extended semiconductor memory being directly addressable by said central processing unit which designates said designating register after the initial program load and designates one of said plurality of memory blocks in said extended semiconductor memory based on the contents of said designating register, so that a first area in said basic semiconductor memory and each of the memory blocks in said extended memory are enabled to be accessed, said central processing unit including reading and writing means for reading, during the initial program load, said at least one of the program or the data from the second area in said basic semiconductor memory and writing said at least one of the program or the data to the first area in said basic semiconductor memory.

* * * * *